United States Patent [19]

Juy

[11] Patent Number: 4,504,250
[45] Date of Patent: Mar. 12, 1985

[54] CONTROL DEVICE WHICH PROVIDES A PLURALITY OF PRE-ESTABLISHED AND CONTROLLED POSITIONS, MORE PARTICULARLY FOR USE WITH THE SPEED GEAR SHIFTING DEVICES FOR CYCLES AND THE LIKE

[75] Inventor: Henri Juy, Dijon, France

[73] Assignee: Establissements Le Simplex, France

[21] Appl. No.: 391,913

[22] Filed: Jun. 24, 1982

[30] Foreign Application Priority Data

Jul. 3, 1981 [FR] France .............................. 81 13459

[51] Int. Cl.³ ............................................ F16H 11/08
[52] U.S. Cl. .................................... 474/80; 74/473 P; 474/78
[58] Field of Search .............................. 474/78, 80, 82; 74/473 P, 474, 141.5, 142, 143; 254/108, 109, 110

[56]  References Cited
U.S. PATENT DOCUMENTS 3,475,981 11/1969 Gerard .................................. 74/143
4,198,873 4/1980 Nagano et al. ........................ 474/82
4,267,744 5/1981 Yamasaki ........................... 474/82 X
4,322,209 3/1982 Shimano ................................ 474/82
4,384,864 5/1983 Bonnard ................................ 474/82

FOREIGN PATENT DOCUMENTS 2542373 4/1976 Fed. Rep. of Germany .... 74/501 R
2012893 8/1979 United Kingdom .................. 74/142

Primary Examiner—Lawrence J. Staab
Assistant Examiner—Dwight G. Diehl
Attorney, Agent, or Firm—Eric P. Schellin

[57]  ABSTRACT

A control device for shifting gears on a cycle wherein a hand lever is operational coupled by a semi-rigid control tie which is coupled to the transmission assembly at the hub. The transmission assembly with a link mechanism which is angularly pivoted by the control tie thereby moving a rack having two at least partly superposed pawls which engage notches in a rack which is coupled to a pin. The pin is slidable mounted so that the pawls can position the pin as required for shifting the chain guide. The extreme notches of the rack are partially obturated to prevent shifting above and below the proper sprocket prevent damage to the device.

17 Claims, 35 Drawing Figures

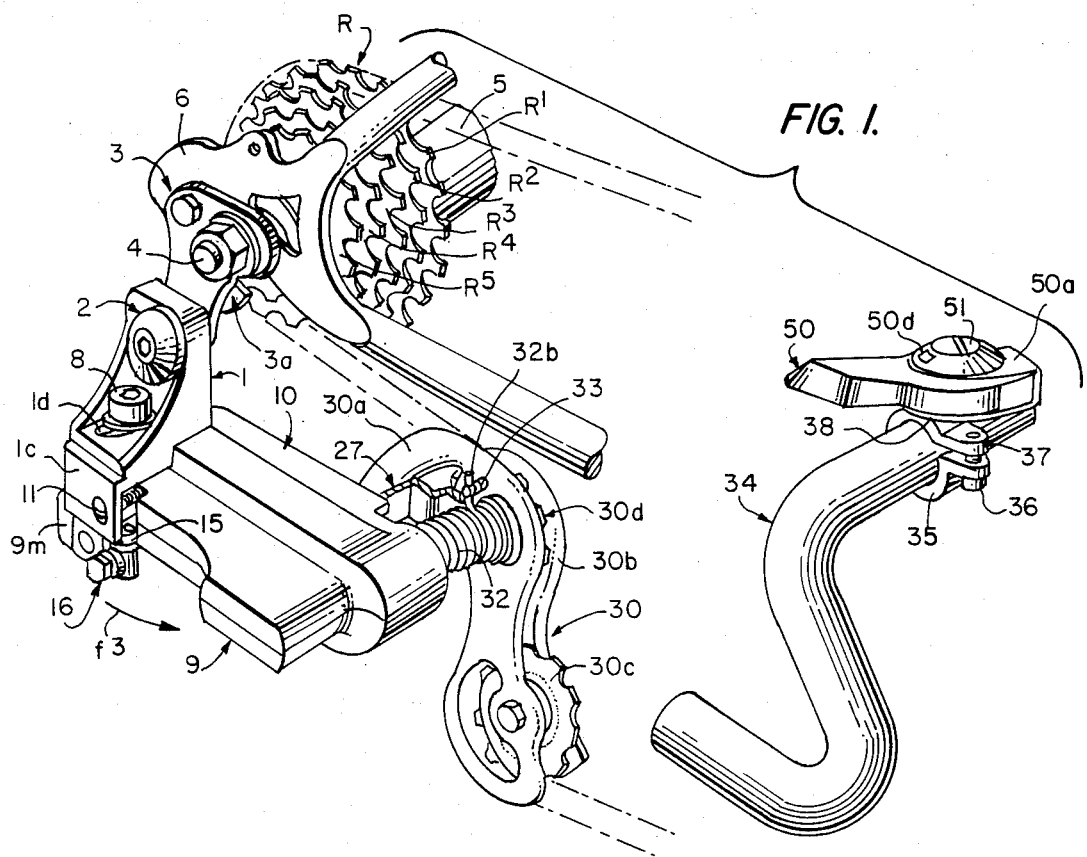

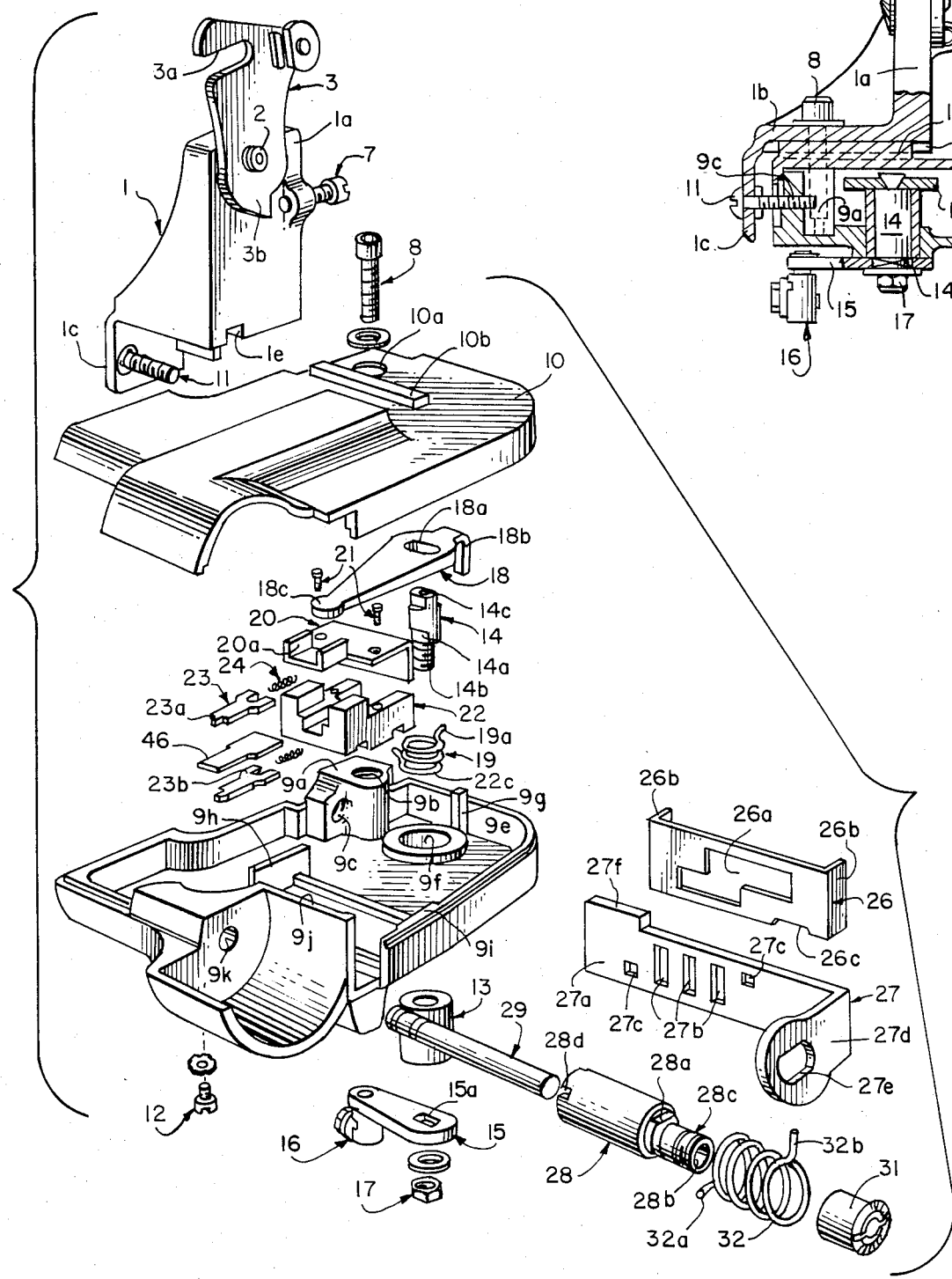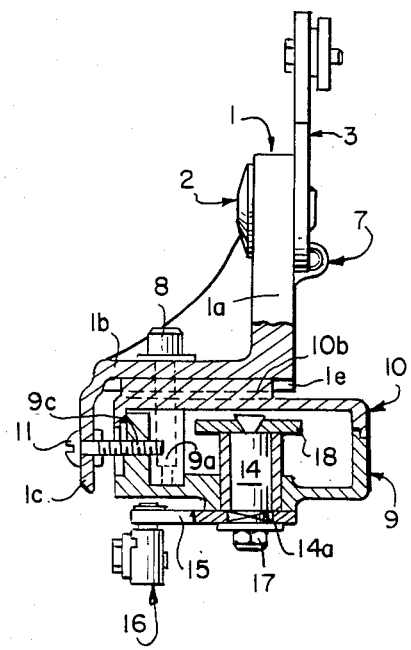

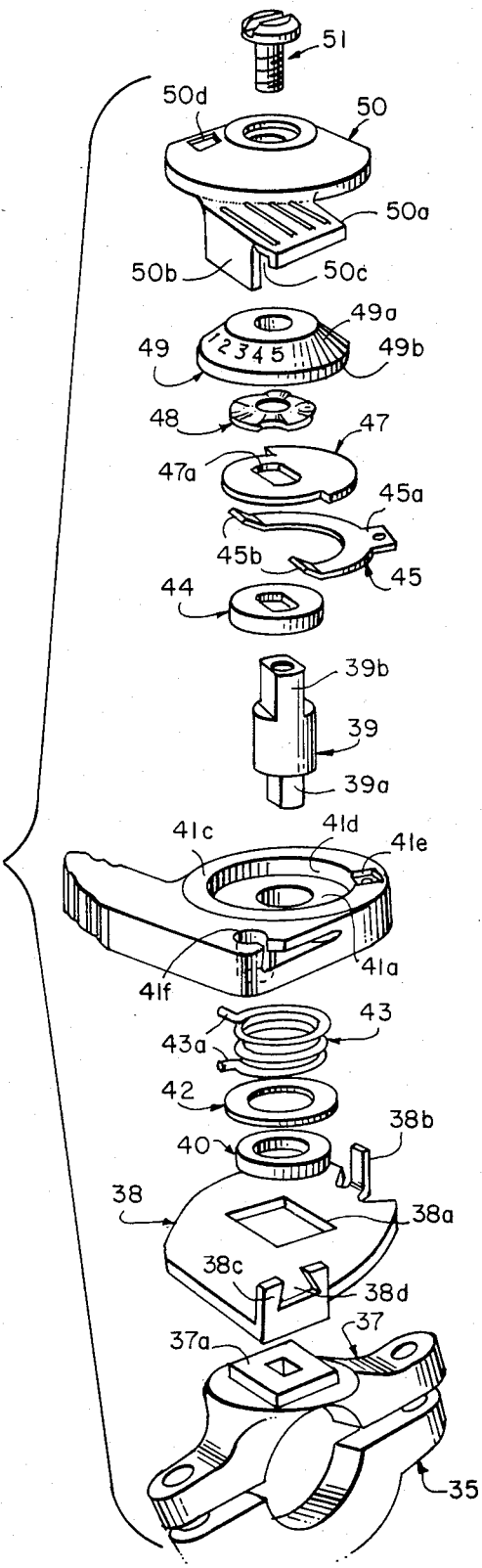
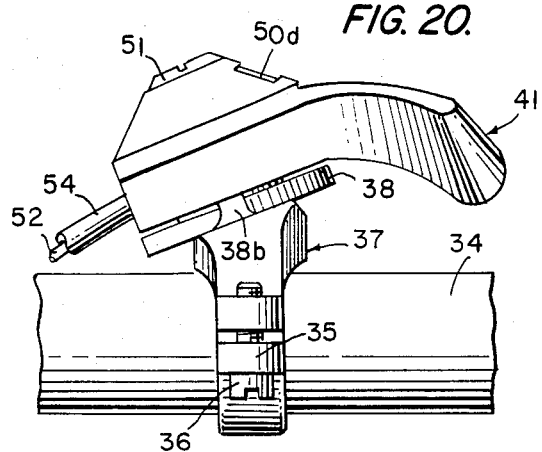
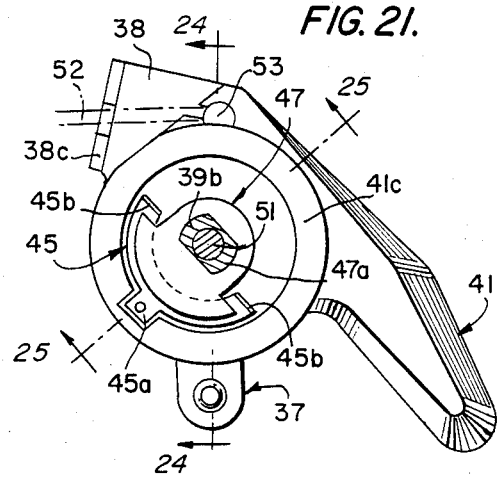
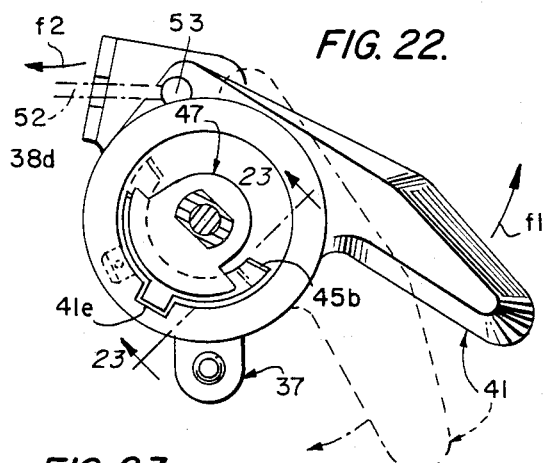
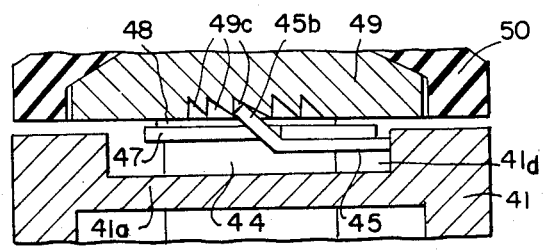

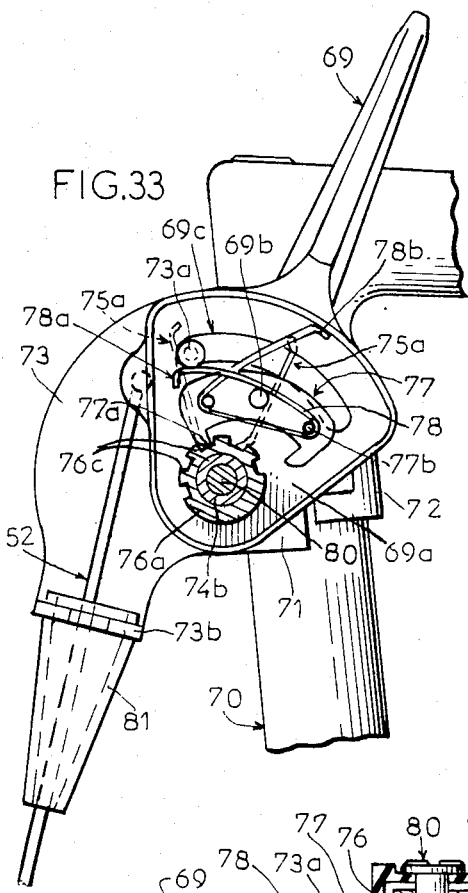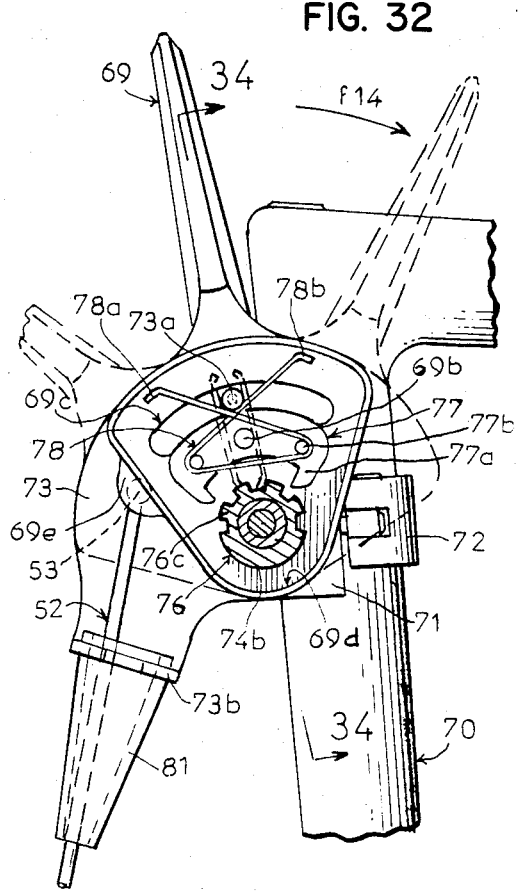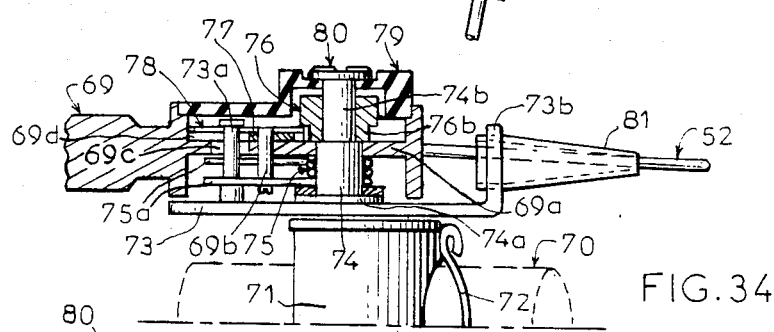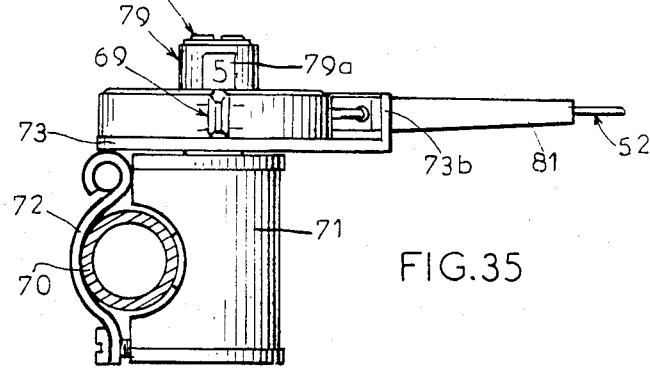

CONTROL DEVICE WHICH PROVIDES A PLURALITY OF PRE-ESTABLISHED AND CONTROLLED POSITIONS, MORE PARTICULARLY FOR USE WITH THE SPEED GEAR SHIFTING DEVICES FOR CYCLES AND THE LIKE

BACKGROUND OF THE INVENTION

1. Field of the Invention

The invention is directed to a control device which provides a plurality of pre-established and controlled positions, more particularly for use with the speed gear shifting devices for cycles and the like.

The subject matter of the invention is concerned with the technical field of the control means and mechanisms, more particularly with such means and mechanisms the purpose of which is to give a plurality of pre-established and biassed positions to the organ or organs being controlled. The subject matter of the invention is also concerned with the speed gear shifting devices and more particularly with the speed gear shifting devices for cycles and the like, a way of use which is more particularly intended, however without restricting the scope of the invention.

2. Description of the Prior Art

Well-known devices have been provided with a view to obtaining similar results, for instance the selector switch which forms the subject matter of the French Patent Application under national registration No. 79.00710 and the first Addition to this Application, under national registration No. 79.31536. However, such devices are not to be considered definitely satisfactory, on account of the many present requirements and the standards of use in the field of the speed gear shifting devices for cycles, which are frequently working in difficult conditions.

SUMMARY

Therefore, the device in accordance with the invention has been chiefly designed with a view to attaining a manufacturing process as simple as possible, in order to minimize substantially the cost of production, while ensuring the necessary safety of operation and achieving also a high degree of reliability for an industrial production rate at the necessary level of output and quality.

In accordance with a first characteristic, this control device includes means for hand control (or other control as the case may be), which are shifted angularly and always with the same amplitude value in either direction from a neutral position up to a limit position. One or more control transmission means connect the operational means to a link mechanism or equivalent mechanism which is pivoted angularly in either direction, pawls or equivalent organs being shifted angularly by said link and cooperating with a rack-like organ which has openings or notches or other driving locations in a number corresponding to the number of the pre-established positions to be provided, and spaced for a value corresponding to the spacing between each one of the sprockets of the free wheel. The rack is mounted parallel to the pin supporting the organ to be positioned and with which the rack is made fast, the organ to be positioned being the chain-guide in the embodiment for speed gear change devices for cycles, and said control device is characterized in that a pin is shifted angularly through the intermediary of the transmission means driven by the hand control means. The pin is integral with the link an extension of which receives the thrust of an elastic means which is tensioned in accordance with the direction of swivelling and tends always to bring back said link in a medial position corresponding to the neutral position of the hand control means or the like. The link cooperates with a system of at least two partly superposed pawls to be engaged in succession with the openings or notches of the rack-like organ, the extreme openings or notches of said rack being obturated in part at different levels for the two endmost notches, so that the corresponding pawl will be unable to drive the rack beyond the pre-established limit positions which are to be occupied by the organ such as the chain-guide to be positioned.

In accordance with a further characteristic, the driving mechanism of the rack and of the organ to be positioned such as chain-guide, includes two superposed pawls the unidirectional nose and the escape ramp of which are inversely disposed for each pawl. The pawls are mounted slidably under the thrust of springs to be engaged together within openings or windows of the rack, the pawls and springs and preferably an intermediate blade between the pawls as well, being mounted in a pawl-holder guided slidably parallel to the rack, in one or more slideways of the casing of the device. A mask is fixedly mounted within the casing between the rack and the pawls, the stepped aperture of this mask permitting the driving action of either one of the pawls in the openings or windows of the rack, the pawl-holder being provided directly or in an inserted manner, in the form of a small plate, a yoke or similar for cooperating with the end of the link integral with the pin which is driven by the transmission means of the hand control.

These and other characteristics will be apparent from the following description.

DESCRIPTION OF THE DRAWINGS

To make the object of the invention better understood, without however restricting it thereby, the device is illustrated by the attached drawings in a particular embodiment for speed gear change devices of cycles.

FIG. 1 is a perspective view illustrating a first embodiment: the speed gear shifting device in accordance with the invention, mounted on the rear wheel of a cycle, and the control hand lever thereof, secured on the handlebar or curved steering bar;

FIG. 2 is a view illustrating in the perspective and in a separate manner the main parts of the speed gear change device in accordance with the invention;

FIG. 5 is a sectional view considered along the broken line 5—5 of FIG. 3, illustrating chiefly the adjustable connection of the casing with the support for the fastening to the rear wheel;

FIG. 6 is a sectional view considered along the broken line 6—6 of FIG. 4, illustrating chiefly the adjustable connection of the casing with the support for the fastening to the rear wheel, and the assembly of the casing and of the housing;

FIG. 19 is a view illustrating in the perspective and in a separate manner the main elements of the control hand lever in accordance with a first form of embodiment;

FIG. 20 is a front view showing the control hand lever in accordance with FIG. 19, secured on the handlebar or the curved steering bar of a bicycle;

FIGS. 21 and 22 are plan views, housing and barrel having been removed, illustrating respectively the control hand lever with the driving pawl-holder thereof in the inactive position and in the operational position;

FIG. 23 is a sectional view on a larger scale considered along the line 23—23 of FIG. 22, illustrating a pawl in operation within the teeth of a barrel or drum to be driven;

FIGS. 24 and 25 are sectional views considered respectively along the lines 24—24 and 25—25 of FIG. 21, showing the mounting of the various elements of the control hand lever in accordance with FIGS. 19-23;

FIG. 32 is a front view illustrating a further form of embodiment of the control hand lever secured on the handlebar stem of a cycle, the housing having been removed in order to see the mechanism more clearly. The amplitude limit positions have been shown in broken lines, and the neutral position of the hand lever has been shown in solid lines;

FIG. 33 is a view similar to FIG. 32, showing the hand lever with the housing being removed, and in the amplitude limit position in one direction;

FIG. 34 is a sectional view considered along the line 34—34 of FIG. 32, illustrating the mounting of the various elements which constitute the hand lever; and FIG. 35 is a plan view illustrating the hand lever in accordance with FIGS. 32-34, secured by a collar on the handlebar stem of a bicycle.

DETAILED DESCRIPTION

Figure 3:
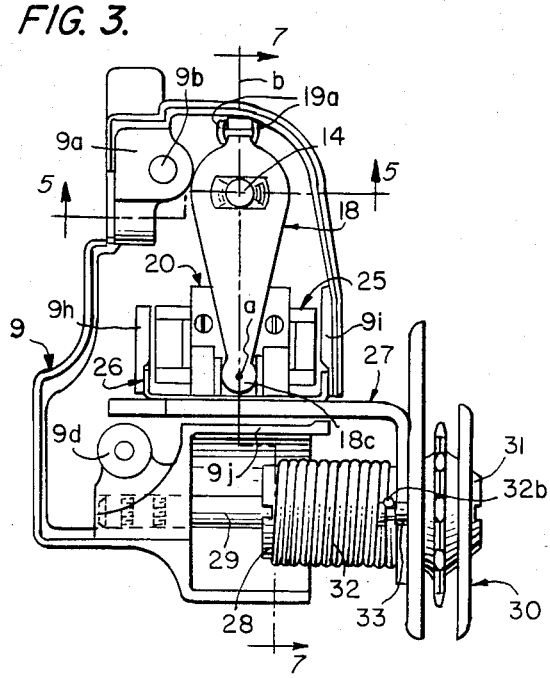
FIG. 3 is a plan view, the casing having been removed, of the speed gear change device shown in the neutral position of the link for the control of the pawls, i.e. in the inactive position.

In accordance with the two forms of embodiment illustrated in the FIGS. 1-18 and 26-31 of the drawings, the rear speed gear change device in accordance with the invention includes a support (1) which is preferably of light alloy, and has three main parts normal to one another, namely: an upper limb (1a), a transverse part (1b) and a lower limb (1c). The upper limb (1a) is connected for free jointing by a screw-pin (2) with a well-known support lug (3) for the securing of the speed gear change device on the pin (4) of the hub (5) of the rear wheel against the frame lug (6), and this through the slot (3a) of the support-lug (FIGS. 1, 2 and 5).

As will be seen also in FIGS. 2 and 5, an adjustable stop (7) is disposed on the rear face of the upper limb (1a), opposite an outstepping (3b) of the support-lug, in order to limit toward the front of the cycle the position of the speed gear change device and more particularly of the chain-guide, in dependence upon the diameters of the sprockets of the free wheel (R), so that the chain-guide will be positioned the more closely adjacent possible to the sprockets.

The transverse part (1b) of the support has an oblong port or aperture (1d) through which is passed a screw (8) for fastening the support to the casing (9) of the speed gear change device, the latter having for this purpose a boss (9a) with tapped hole (9b), and this after being passed through a hole (10a) formed on a housing (10) the shape of which is complementary to the casing (FIGS. 1, 2 and 6).

The support (1) is on the other hand secured on the casing in a transversely adjustable manner, so that the chain-guide connected with the casing will be in alignment with the smaller sprocket of the free wheel when the speed gear change device has the chain-guide positioned on the first gear. For this purpose, a transverse guiding of the support (1) is provided through the intermediary of a groove (1e) located beneath the transverse part (1b) and cooperating with a slideway (10b) formed on the housing (10). The transverse adjustment of support (1) is then effected by a screw (11) mounted for free rotation but held from translation within the lower limb (1c) of the support, and cooperating with a tapping (9c) formed within the boss (9a) of the casing (FIGS. 2 and 5).

It will be clearly understood that by unlocking the fastening screw (8), the support (1) can be caused to slide relative to the casing (9) and to the housing (10) by actuating the screw (11).

It will be noted that the housing (10) is laid on the casing by encasing along the stepped peripheral ledge of both, then housing and casing are fastened to one another by the fastening screw (8) of the support (1) and by a screw (12) passing through an orifice (9d) of the casing and cooperating with a threaded boss (10c) of the housing, adjacent to the support-pin of the chain-guide (FIG. 6). The mechanisms of the speed gear change device are thus protected efficiently against external splashes and dirt.

The casing (9) has adjacent to the boss (9a) a bearing (9e) the bore (9f) of which receives with a tight fit a sleeve (13) for guiding with free rotation a pin (14) which constitutes the connecting organ between a transmission means (lever) and a control organ (link) of the chain-guide.

Figure 7:
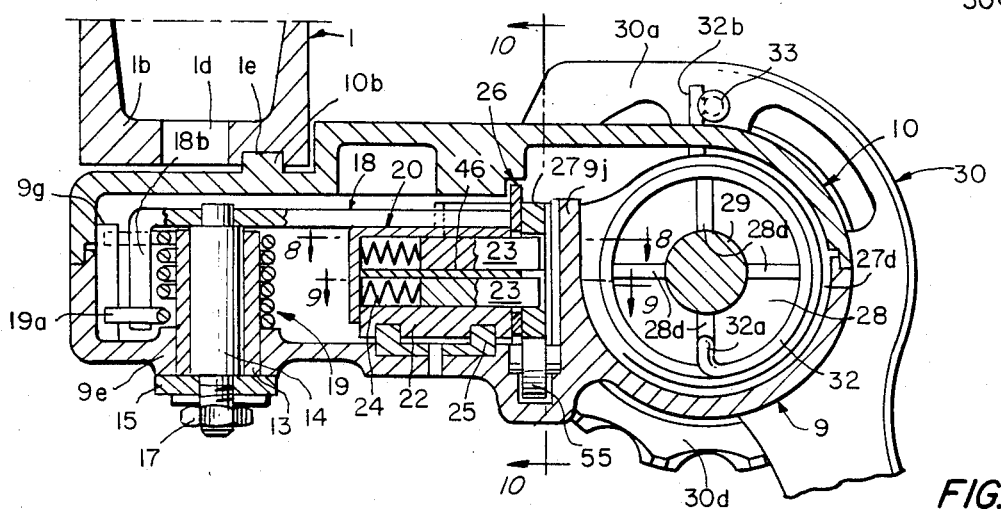
FIG. 7 is a view on a larger scale and a sectional view considered along the line 7—7 of FIG. 3, showing mainly the mounting of the link-holding pin, of the superposed pawls, of the rack, and the connection with the chain-guide.

For this purpose, the pin (14) is provided at the lower part with flattened portions (14a) or equivalent means of angular indexation, cooperating with the aperture shaped in a complemntary manner (15a) of a lever (15) the other end of which is supporting a device (16) for tightening the half-rigid or flexible tie (not shown) connecting the speed gear change device with the hand control means thereof (which will be discussed later). A threaded bearing (14b) of the pin and a nut (17) provide the fastening of the pin (14) with the lever (15) seving as transmission means (FIGS. 2, 5 and 7).

At the upper part, the pin (14) is also provided with flattened portions (14c) or the like, for the angular indexation of the chain-guide control organ which is a link (18) having for this purpose an aperture (18a) the shape of which is complementary to the flattened portions (14c), said link being retained in a fixed or detachable manner on the pin (14) by any desired means such as screwing, riveting . . .

The end of the link (18) more adjacent to the aperture (18a) is bent downwardly in the form of a tongue (18b) to run along an inner projection (9g) of the casing when the link is in the inactive position, i.e. when this link is parallel to the longitudinal axis of the casing (FIG. 3). In this position, the ends (19a) of a coiled spring (19) mounted concentrically around the sleeve (13) between the link (18) and the bearing (9e) abut in a tensile manner on either side of the projection (9g) and the tongue (18b) extends then between the ends of the spring (FIGS. 3 and 7).

The opposite end of the link (18) is thinned down and forms a toggle or circular head (18c) which is engaged within a yoke (20a) formed at the end of a squared metal sheet (20) which is secured laterally at (21) on the lateral posts (22a) of a pawl-holder (22).

Figure 8:
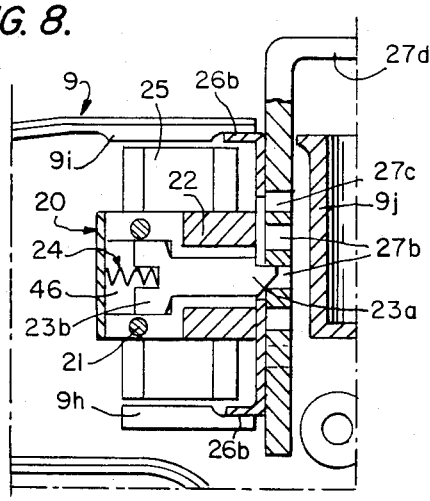
FIGS. 8 and 9 are partial sectional views considered respectively along the lines 8—8 and 9—9 of FIG. 7, illustrating the engagement of the pawls within the rack.
Figure 9:
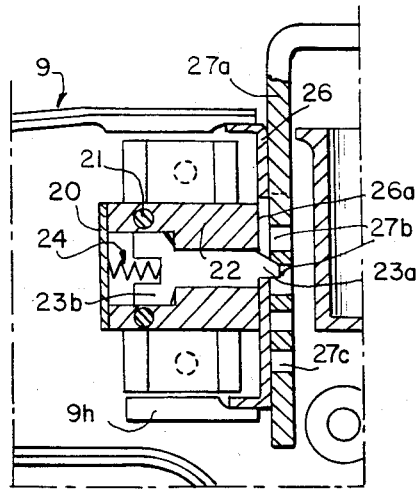

The pawl-holder (22) is provided axially with a stepped notch (22b) in which two superposed pawls (23) are disposed slidably and so that their active contoured portion (23a) will be facing inversely to one another (FIGS. 2, 8 and 9). A thin metal sheet (46) is interposed between the two pawls in order to make their sliding easier.

The enlarged rear portion (23b) of each pawl is notched to receive a coiled spring (24) in abutment against the squared metal plate (20), in order to urge the pawls steadily in a forward direction.

The pawl-holder (22) is also provided on the inner face thereof with transverse grooves (22c) for cooperating slidably with slideways (25) formed directly within the casing or inserted therein (as illustrated in FIGS. 2, 3, 4, 7, 8 and 9).

In front of the pawl-holder, on the side where the active ends of the pawls (23) are protruding, a metal plate (26) is disposed parallel to the slideways (25), this metal plate being called hereinafter a "mask", owing to its being capable of retaining the pawls (23) when they are in contact with the solid surface of said plate, or of allowing them to pass when said pawls are in alignment with a stepped aperture (26a) of the mask, of which more will be said later. The folded lateral ends (26b) of the mask are laid against walls (9h) (9i) of the casing in view of the transverse positioning thereof (FIGS. 8 and 9), while the height of the mask is dimensioned so that this mask will be unable to move in this direction when the housing (10) is assembled to the casing (9), as may be seen in FIG. 7.

In the longitudinal direction, the mask (26) is retained with clearance by the transverse engagement between said mask and a wall (9j) of the casing of a squared piece (27) the limb (27a) of which is engaged within the casing and constitutes a rack, as this limb is provided with intermediate windows or apertures (26b) and extreme windows or apertures (27c), for alternate engagement with pawls (23), as will be seen later. The limb (27a), driven by the pawls (23), is resting on a roller (55) housed within the casing, in order to facilitate the sliding motion (FIG. 7). The mask (26) is cut away at (26c) for the passage on the roller (55).

The other limb (27d) of rack (27) includes centrally an aperture with flattened portions (27e) or similar means for angular indexation and securing on a bearing face of complementary shape (28a) provided on a bushing (28).

The bushing (28) is mounted slidably by means of the axial bore (28b) thereof on a smooth pin (29) which is made fast in a fixed or detachable manner with the casing (9) which comprises for this purpose a chamber (9k) provided within a boss of said casing, in a parallel manner relative to limb (27a) of the rack.

Figure 4:
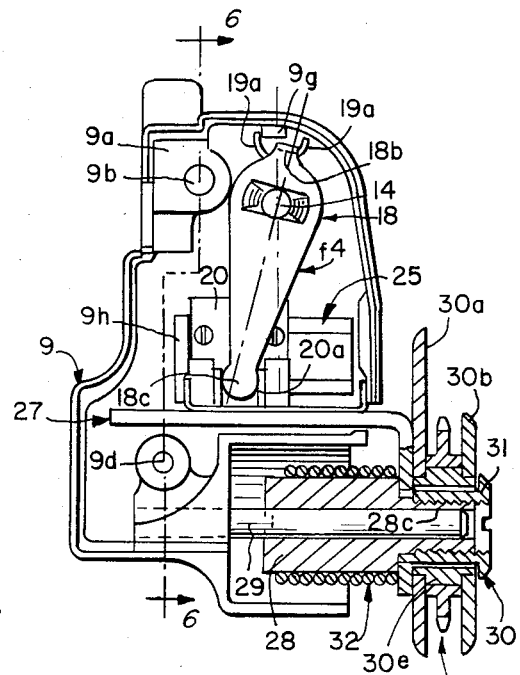
FIG. 4 is a view similar to FIG. 3 illustrating the speed gear change device with the link being actuated in one direction, i.e. in the course of gear shifting.

As best seen in FIG. 4, the chain-guide (30) consists of an internal cheek (30a) and of an external cheek (30b). At the lower end, the cheeks are supporting for free rotation a roller (30c), while the other roller (30d) is mounted for free rotation on a spacer (30e) the outermost shoulders of which are integral with the cheeks so that the spacer will be journaled with the cheeks. This cheek-spacer assembly can rotate freely and with some clearance in the transverse direction relative to a shouldered nut (31) screwed on the threaded end (28c) of bushing (28) to abut against the limb (27d) of the rack, thereby locking the latter against the bushing; the nut (31) being hollow in order to permit pin (29) to extend therethrough.

It will be well understood that the chain-guide (30), in a known manner, has also the purpose to tension the chain which is wound therein. For this purpose, a coiled spring (32) is mounted concentrically to the bushing (28) with an end (32a) engaged within one of the slots (28d) provided on the rear face of the bushing, while the other end (32b) of the spring abuts tensionally against a stud (33) integral with the internal cheek (30a) of the chain-guide (FIG. 7).

A first form of embodiment of the hand control organ for shifting the chain-guide (30) will be described now, more particularly with reference to FIGS. 19–25 of the drawings.

It will be seen in FIG. 1 that the hand control organ is designed to be secured on the handlebar or curved steering bar (34) of the bicycle, preferably between the stem and the curved or bent portion, i.e. closely adjacent to the hand of the user who is holding the handlebar either by the ends thereof when it is a flat handlebar, or "by the top" when the handlebar is for a racing-bicycle.

For this purpose, the control organ comprises a half-collar (35) assembled by screw (36) round the handlebar, with a further half-collar (37) which constitutes the hand lever support and is slanted transversely (FIG. 20) in order to direct downwardly, in a direction toward the oblique tube of the frame, the threadlike control tie or cable. At the upper part, the support or half collar (37) has a polygonal bearing face (37a) for the mounting and the angular indexation of a sector of sheet metal

(38) provided for this purpose with a complementary shaped central aperture (38a).

The bearing (37a) is also provided with an axial opening (37b) with flattened portions or similar indexation means for the corresponding bearing face (39a) of a pivot-pin (39) forced in within this opening (FIGS. 24, 25). A washer (40) engaged on the pivot pin is then laid above the sector (38), and the control lever or hand lever (41) is engaged above the washer by means of the hub (41a) thereof, the shouldered end of which receives by crimping a washer (42) as retaining means for a coiled spring (43) which is thus retained round the hub (FIGS. 24 and 25).

The coil spring (43), like the return spring (19) of link (18), is provided with curved ends or limbs (43a) for abutting tensionally on either side of an inside projection (41b) of the hand lever (FIG. 24), and a curved tongue (38b) of the sector (38) is engaged when assembling between the limbs (43a) of the spring. This tongue (38b) serves also as a limiting stop for the angular shifting of the hand lever in either direction.

The upper face (41c) of the hand lever has a chambering (41d) within which is engaged a spacing washer (44) which is rotationally indexed on a bearing face with flattened portions (39b) of the pivot-pin (39). A pawl (45) of thin metal sheet is positioned by means of a lateral lug (45a) within a notch (41e) of the upper face of the hand lever (FIGS. 21, 22 and 25). This pawl has the general shape of a half-crown the ends of which are bent upwardly to constitute the active portions (45b).

A thin sheet of metal (47), formed by two half-circles of different diameters, is engaged by means of its aperture with flattened portions (47a) on the bearing face (39a) of the pivot-pin, above pawl (45), for constituting a mask relative to the active parts (45b), as will be seen later.

Following the mask (47), an elastic washer (48) is mounted around the bearing face (39b) and the whole assembly thereof is capped by a barrel or drum (49) at the upper end of the pivot-pin, said barrel or drum being in turn covered by a protection housing (50) mating with the configuration of the barrel and having an extension (50a) with flapping (50b) and positioning notch (50c) for secure fastening on a raised portion (38c) of the sector (FIG. 24), the barrel-housing assembly being secured on the sector by means of an axial screw (51) screwed into the pivot-pin (39).

The barrel or drum (49) is preferably made of plastics and includes: a conical upper part (49a) and an inner face (49b) having at two diametrially opposed locations two sectors with teeth (49c) of the "crotchet iron" type, i.e. comprising a face normal to the lower face for driving by the pawl and a slanted face for the escape of the pawl (FIG. 23).

The conical part (49a) is also provided in any well-known manner (pasting, engraving . . . ) with numerals 1, 2, 3, 4, 5 . . . corresponding to the number of the gear sprockets, and the housing (50) has a window (50d) facing these numerals.

The threadlike control tie or cable between the hand lever (41) and the lever (15) is a half-rigid metal rod (52) of the "piano wire" type having at the end thereof a cotterpin (53) housed within a chambering (41f) of the hand lever situated adjacent to the raised portion (38c) of the sector, said cotterpin extending therethrough through a large opening (38d). A sheath (54), of a type well-known in se, but which must be non compressible and non extensible, is disposed and retained between the raised portion (38c) of the sector and the sheath stop (9m) formed beneath the casing (9) adjacent to the clamping device (16) of the rod (52).

The operation of the speed gear change device and of the control means thereof in accordance with the first form of embodiment illustrated in the FIGS. 1-25 of the drawings wherein it is assumed that the speed gear change device is designed for the shifting of five gear sprockets at the free wheel (R).

The motions of the rack (27) supporting the chain-guide (30) are more particularly illustrated in FIGS. 10-18 which are cross-sectional views along the line 10-10 of FIG. 7, i.e. considered between casing wall (9f) and rack (27).

Figure 10:
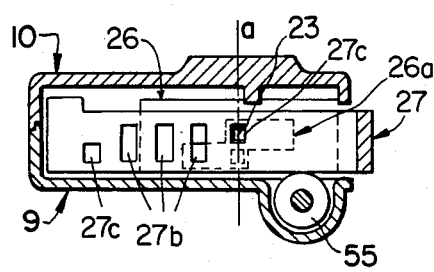
FIGS. 10-18 are sectional views considered along the line 10—10 of FIG. 7, illustrating the various positions of the rack to be obtained by actuating in one direction the link which is driving the pawl-holder.

It will be seen in FIG. 10 that the rack (27) is engaged maximally within the casing (9). This position corresponds to the alignment of the chain-guide (30) with the smaller sprocket (R5) of the free wheel (R) (position pre-adjusted by the shifting of the casing (9)—housing (10) assembly on the support (1) with the aid of the screw (11)).

In this position, the link (18) for the control of the pawl-holder (22) is at rest, i.e. in the position shown in FIG. 3, with the toggle-forming end (18c) thereof situated within the longitudinal axis (b) of the casing, and the rear tongue (18b) thereof in alignment with the internal projection (9g) of the casing, between the two limbs (19a) of the return spring (19).

Likewise, the control hand lever (41) at the handlebar is also at rest as illustrated in FIG. 21, with the active parts (45b) of the pawl meshing with the teeth (49c) of the barrel or drum (FIG. 23), the mask (47) permitting the active parts (45b) of the pawl to extend on either side, and the numeral 5 is displayed in the window (50d) of the housing.

Should it be desired to shift the chain-guide (30) to the second sprocket (R4) of the free wheel, the hand lever (41) will then be actuated in the direction of arrow (f1), FIG. 22. In this section, the active part (45b) of pawl (45), situated in the direction of movement and meshing with a tooth, drives the barrel or drum (49) in the same direction, while the other active part (45b) is passed by elasticity beneath the mask (47) (full lines, FIG. 22). Still during this very actuation of hand lever (41), the inner projection (41b), by being moved angularly, pulls along an end (43a) of the return spring (43) which is tensioned so that, once the hand lever (41) is released after having achieved a complete amplitude, said spring (43) will cause the hand lever to be returned to the neutral position, without driving of the barrel by reason of the escape of the pawl on the slanted face of said tooth.

The half-rigid rod (52) is caused to be pushed (arrow f2, FIG. 22) by the actuation of the hand lever (41) and to transmit its movement to the lever (15) supporting the organ (16) for clamping the rod. Said lever is pivoted in the direction of arrow (f3), FIG. 1, pulling along thereby the link (18) in the direction of arrow (f4), FIG. 4, against an end (19a) of the return spring (19) which is spaced away by the tongue (18b) of the link (dashed lines, FIG. 4).

During this action, the pawl-holder (22) is pulled along slidingly on the slideways (25) of the casing by the link (18).

Figure 11:
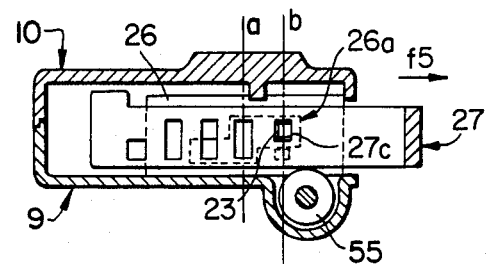

As will be seen in FIGS. 10 and 11, at the very start of this action, (FIG. 10), the upper pawl (23) urged by the spring (24) thereof crosses through the stepped aperture (26a) of the fixed mask (26) and extends (by the unidirectional active part or driving nose (23a) thereof) into the upper extreme window (27c) which is restricted dimensionally for the engagement of the upper pawl only, while the reverse lower pawl crosses through the aperture (26a) of the mask and abuts against the rack (27) beneath the window (27c).

When the link (18), materialized in these fundamental Figures by the axis (a) corresponding to the axis of the toggle (18c), is pivoted in the direction of arrow (f4), the upper pawl pulls along the rack (27) in the direction of arrow (f5) FIG. 11, and therefore the chain-guide (30), causing thereby the chain to be changed over to the sprocket (R4).

As discussed above, when the hand lever (41) is released, this hand-lever is returned to the neutral position by the spring (43); the numeral 4 being displayed in the window (50d) of the housing. The control rod (52) connected to the hand lever draws the transmission lever (15) with the assistance of the spring (19) of the link which is returned in neutral position while pulling back the pawl-holder (22) the upper pawl of which escapes from the upper extreme window (27c), while the lower pawl slides against the mask (26) beneath the stepped aperture (26a).

Figure 12:
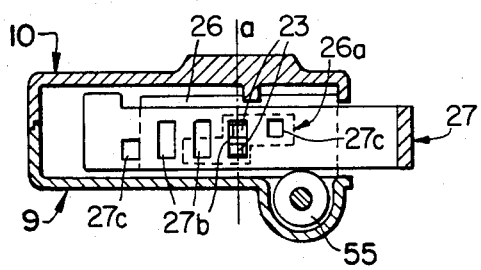
Figure 13:
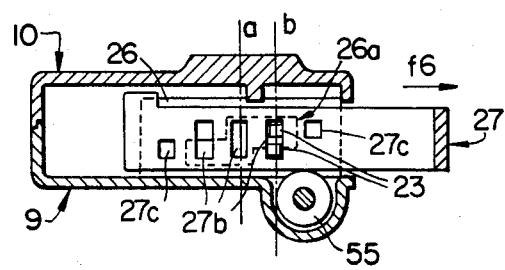

FIG. 12 illustrates the inactive or neutral position of the link (axes (a and b) being merged into one another), the chain-guide being in alignment with the sprocket (R4) of the free wheel, and the upper and lower pawls being engaged within the first intermediate window (27b) the height of which is twice the height of the extreme windows, in order to allow both pawls to pass freely to pull along the rack in both directions.

To change over the chain-guide (30) to the third sprocket (R3) of the free wheel, the hand lever (41) is actuated in the same way as above in order to perform a complete amplitude. As will be seen in FIG. 13, the pivotal motion of the link (18) materialized by the axis (a) causes the rack to be pulled along in the direction of arrow (f6) by the unidirectional driving nose (23a) of the upper pawl (23) extending through the aperture of the mask, while the lower pawl slides against the solid portion of the mask beneath the aperture. When the hand lever (41) is released, the link (18) is returned to the neutral position, the upper pawl escapes from the first window (27b), while the lower pawl slides against the mask (26).

Figure 14:
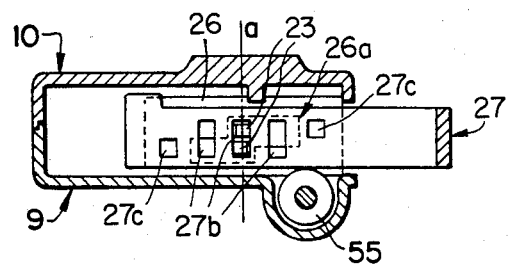

Both pawls are then engaged elastically within the second intermediate window (27b) of the rack (FIG. 14).

Figure 15:
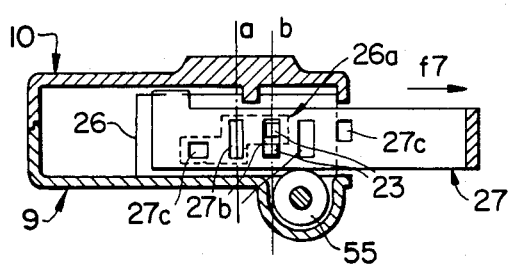

Changing over the chain-guide (30) to the fourth sprocket (R2) of the free wheel is effected in the same way as above, the rack (27) being pulled along in the direction of arrow (f7), FIG. 15, by means of the upper pawl passing through the aperture of the mask (26), while the lower pawl slides against the mask beneath the aperture (26a).

Figure 16:
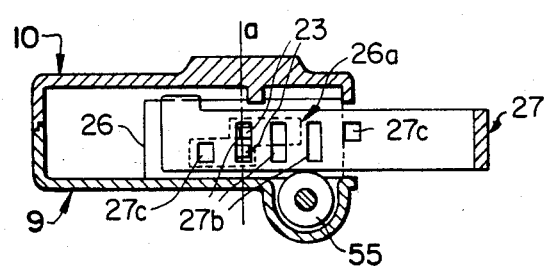
Figure 17:
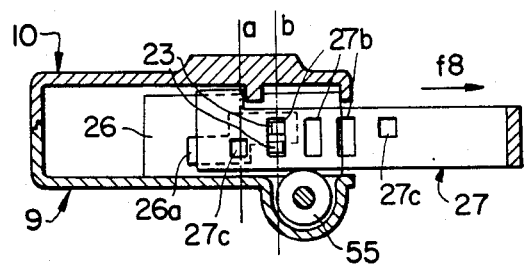

When returning to neutral position, FIG. 16, the two pawls are engaged within the third intermediate window (27b), and it is possible again to pull along the rack (27) by means of the upper pawl (arrow f8, FIG. 17) to place the chain-guide (30) on the fifth sprocket (R1) of the free wheel.

Figure 18:
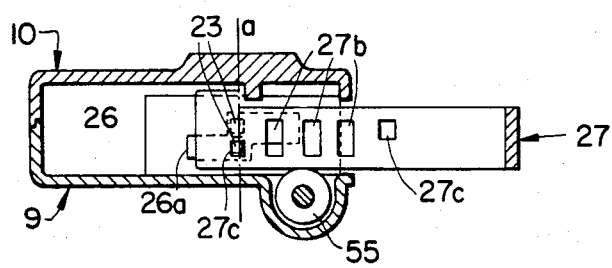

When the pawls (23) are returned to the neutral position, FIG. 18, the upper pawl passes through the aperture (26a) of the mask and abuts against the rack (27) as there is no intermediate window at this location, but only a lower extreme window (27c) of the same dimension as the opposite homologue thereof, while the lower pawl is engaged within said lower window (27c) for pulling along the rack in the reverse direction when it is desired to return to the sprockets of smaller diameters, and namely by an amplitude in the reverse direction, arrow (f9), FIG. 22.

It will be noted that the rack (27) is provided on the upper ledge thereof with a shoulder (27f) at the end of limb (27a) which comes to abut against a stop (10d) formed in the housing (10), in order to prevent the rack from escaping from the casing (FIG. 18).

It will be also apparent that the extreme positions of the rack (FIGS. 10 and 18) corresponding to the extreme gears are interlocked in the considered direction of drive or pull only, as the windows (27c) are established with a half-height, preventing thus the action of either the upper pawl or the lower pawl. This particular feature of the half-height of the extreme windows prevents any damage to the mechanism, more particularly to the speed gear change device, in the case where the user would continue to actuate the hand lever wrongly.

Likewise, it will be pointed out more particularly that in the intermediate positions corresponding to the gearings given by the sprockets (R2, R3, R4), the two pawls are engaged within the intermediate windows (27b), and the interlocking of the rack is effected in both directions.

Concerning the hand lever (41), it will be noted that the number of crotchets provided on the inner face of the barrel or drum (49) will be equal to the number of speed rates minus one, i.e. four teeth for the example of five speed rates discussed here. With such an arrangement, it is possible, after a complete cycle of operation in either direction, to prevent on the hand lever a superfluous impulse which would drive the barrel or drum, and cancel the numeral of the extreme speed rate displayed in the window (50d).

In accordance with a second form of embodiment illustrated in FIGS. 26-31 of the drawings, the speed gear change device is designed with the same arrangements concerning the fastening support (1) and the adjustment thereof relative to the casing, the assembly of the casing and of the protective housing thereof, as well as the chain-guide (30) with the means for the assembly thereof within the casing, the tension spring (32) and the rack (27) with intermediate windows (27b) and extreme windows (27c) for this chain-guide, and the bearing guide means (55) thereof within the casing.

This form of embodiment includes also the transmission lever (15) to which the half-rigid control rod is attached and which drives pivotally by means of a pin (14) a control link (56) against a torsion spring (19) the end limbs (19a) of which extend on either side of a depending finger or tongue (56a) of the link, and an internal projection (9g) of the casing against which said limbs are applied tensionally.

In this form of embodiment, the driving pawls of the rack are driven in the following manner:

A pawl (57) for driving the rack in the direction in which the chain-guide is changed over from the smaller to the larger sprocket of the free wheel, is connected hingedly to an end of the link (56), with a torsion spring (58) wound around the pin (59) thereof, the limbs of which are connected respectively to the pawl and to the axial finger (56b) of the link.

The other pawl (60) for driving the rack in the other direction is connected hingedly to one of the ends of a lever (61) which is in turn connected hingedly to the link (56). The lever (61) is approximately within the plane of pawl (57), so that the second pawl (60) will be situated above pawl (57), this making it possible for the two pawls to be partly superposed, the required space in the width being thus spared accordingly. The active parts (57a, 60a) which form unidirectional driving nose and escape ramp, are facing one another in a superposed manner.

As this is the case for the first pawl, a torsion spring (62) is wound around a pivot pin (63) of pawl (60), the limbs thereof being connected respectively to the pawl and to the pivot pin (64) of the lever (61) on the link. A further torsion spring (65) is wound around the pin (64), the ends thereof being tensionally abutted against the finger (56b) and against the lever (61).

Figure 26:
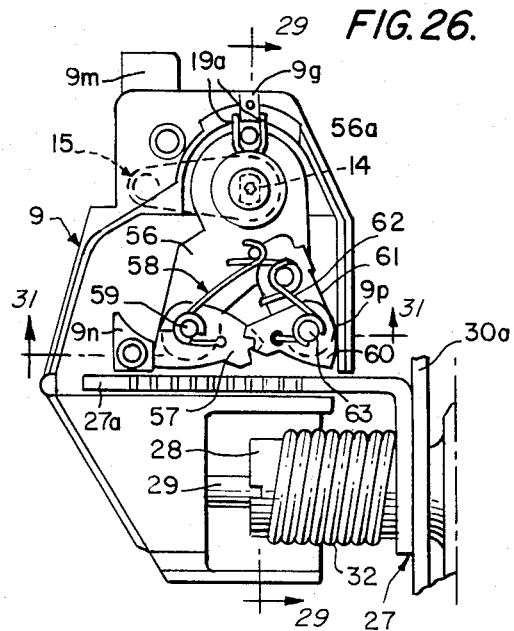
FIG. 26 is a plan view, the housing having been removed, illustrating a second form of embodiment of the speed gear change device in accordance with the invention, this second form of embodiment being shown with the control link of the pawls in the neutral position, i.e. in the inactive position.
Figure 27:
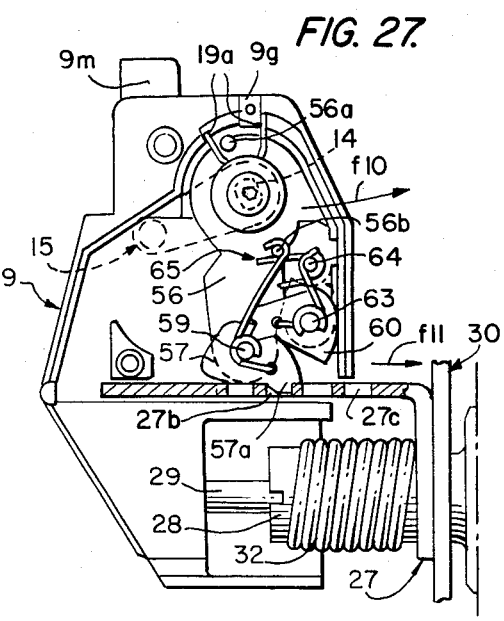
FIG. 27 is a view similar to FIG. 26, illustrating the link being actuated in the direction according to which the chain-guide is driven in the direction of a larger sprocket of the free wheel.
Figure 28:
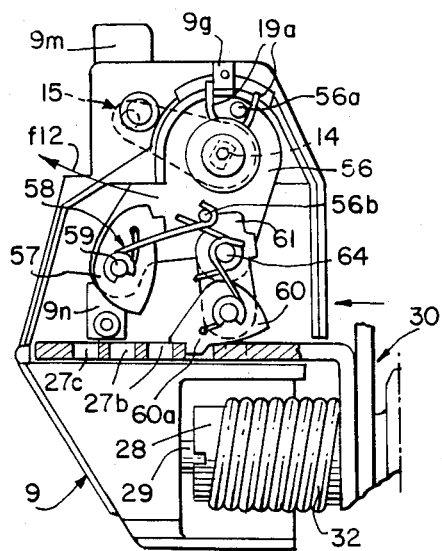
FIG. 28 is a view similar to FIG. 26, illustrating the link being actuated in the direction according to which the chain-guide is driven in the direction of a smaller sprocket of the free wheel.

The assembly with elastically hinged mounting of both pawls (57-60) and of the lever (61) makes it possible, as this will be readily apparent from FIGS. 26, 27 and 28, to arrange the pawls either in the uncoupled position of the apertures or windows of the rack, when the link (56) is not actuated (FIG. 26), or with either one of the pawls meshing within a window of the rack, when the link (26) is actuated in either direction (FIGS. 27 and 28).

In the inactive position, the two pawls are spaced from the rack and abut by their cam-shaped rear face against walls (9n, 9p) of the casing (FIG. 26), the pawls being thus caused to tip over and to be disengaged from the windows of the rack.

When the link (56) is actuated in the direction of arrow (f10), FIG. 27, the rear portion of pawl (57) is moved away from its respective abutment wall (9n) and said pawl (57) is caused to tip over by the torsion spring (58), the active part (57a) of this pawl being engaged within one of the windows (27c) or (27b) of the rack, thereby pulling along the latter in the direction of arrow (f11).

When the hand lever of the speed gear change device is released, the link (52) is returned to the neutral position under the action of the return spring (19) thereof, and the pawl (57) is brought back to the initial position thereof in FIG. 26.

When the link (56) is actuated in the reverse order (arrow (f12), FIG. 28), the pawl (57) is tipped rearwardly on the ramp of the wall (9n). The pawl (60), pulled along by the lever (61) which is pivoted by the axial finger (56b) of the link, is moved away from the wall (9p) and is tipped by means of the torsion spring (62) thereof for engagement with its active part (60a) in one of the windows (27b) or (27c) of the rack which is thereby pulled along in the direction of arrow (f13).

As set forth above, in the position corresponding to the extreme speed rates, the arrangement of the windows (27c) which are no more located within the field of movement of the corresponding pawl prevents said element from actuating the rack. Therefore, any damage to the mechanism is also avoided here, in the event of a superfluous impulse on the hand lever.

An interlocking has been provided for all of the speed rates, in order to prevent the disconnection of the rack relative to the casing or the disalignment of the lower extreme window of the rack relative to pawl (57).

Figure 30:
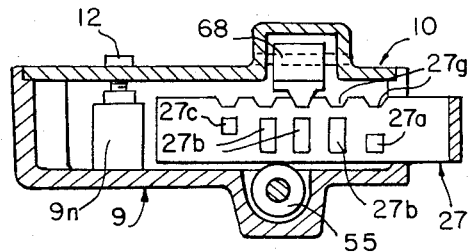
FIG. 30 is a sectional view considered along the line 30—30 of FIG. 29, showing more particularly the interlocking of each position of the rack.
Figure 31:
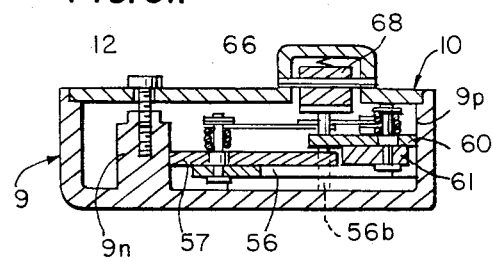
FIG. 31 is a sectional view considered along the line 31—31 of FIG. 26, showing more particularly the mounting of the pawls on the control link.
Figure 29:
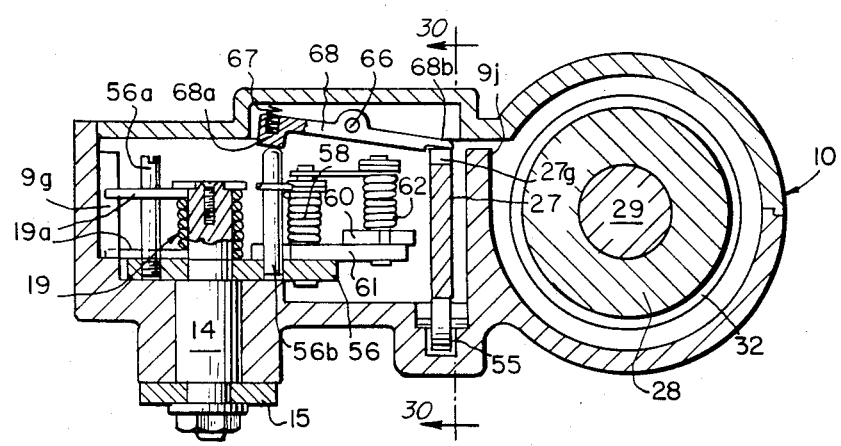
FIG. 29 is a sectional view considered along the line 29—29 of FIG. 26, showing the mounting of the various parts of the speed gear change device.

For this purpose, and as illustrated in FIGS. 29 and 30, a rocker 68 is mounted hingedly at (66) within a chamber (10e) of the protection housing. An enlarged end (68a) of the rocker is permanently abutted on the axial finger (56b) of the link (56) when the latter is in the neutral position. For this, a spring (67) or equivalent elastic means is interposed between the end (68a) of the rocker and the bottom of the chamber (10e).

In this position, the other contoured end (68b) of the rocker is engaged within one of the notches (27g) provided on the upper ledge of the limb (27a) of the rack.

It will be noted that there are as many notches (27g) as windows (27b) and (27c), and therefore as many notches as there are gears to be shifted.

With reference now to FIGS. 32-35 of the drawings, there will be described now a further form of embodiment of the control organ for the speed gear change device.

In this form of embodiment, the control hand lever (69) is secured to the stem (70) of the bicycle by any well-known means such as a collar made of two parts (71, 72) and designed as the case may be for receiving also the control hand lever of the speed gear change device.

As in the preceding device, the half-collar (71) is arranged for receiving and indexing a sector (73) supporting a pin (74) on which the hand lever (69) is journaled. A torsion spring (75) is wound around the pin (74) between the wall (69a) of the hand lever and a shoulder (74a) of the pin. The spring has limbs (75a) extending on either side of a pivot (69b) depending from the wall (69a) of the hand lever, and on either side of a finger (73a) connected to the sector (73) and extending through a sector opening (69c) of the wall of the hand lever.

A barrel or drum (76) is mounted for free rotation on a bearing portion of pin (74), above the wall (69a). This barrel or drum has a cylindrical bearing face (76a) on which the numerals 1, 2, 3, 4, 5 . . . for referencing the speed rates are written in any well-known manner, and a cylindrical bearing portion (76b) formed with teeth or grooves (76c) corresponding to the number of gears to be changed over.

On the pivot (69b) is mounted for free rotation a pawl (77) the form of which is similar to the sector opening (69c) and the projecting ends of which constitute hooks (77a) for engagement between the teeth (76c) of the barrel or drum, during the shiftings of the hand lever (69).

The pawl (77) is retained in the neutral position by a claw spring (78) the medial portion of which is wound around spaced studs (77b) of the pawl, the ends (78a-78b) of which being crossed and abutting tensionally against finger (73a).

A protection housing (79) fits on the hand lever and around the barrel or drum (76), wherein this housing allows the reference numerals for the speed rates to appear through a window (79a), as may be seen in FIG. 35. Housing and hand lever are retained together by an axial screw (80) cooperating with the pivot pin (74).

On one side, the hand lever is provided with a yoke (69e) for the articulation of the cotterpin (53) of the half-rigid control rod (52) which is passed then with a substantial clearance through a guiding tunnel (81) clipsed on a raised portion (73b) of the sector.

It will be apparent that when the hand lever (69) is actuated for instance in the direction of arrow (f14) in FIG. 32, in accordance with a complete amplitude, i.e. until the finger (73a) of the sector (73) is abutted in the bottom of the aperture (69c) of the hand lever, the pawl (77) is tipped in the direction illustrated in FIG. 33, by reason of the increase of tension to which the limb (78a) of the claw spring abutting against finger (73a) is submitted.

The hooked end (77a) of the pawl situated on the side of this limb of the spring is then engaged between two teeth (76c) of the drum or barrel, driving same rotationally.

When the hand lever is released and returned automatically to the neutral position on account of the return effect of spring (75), a neutral position is taken again by the pawl, without driving the barrel or drum.

It will be well understood that the two forms of embodiment of the hand lever and of the speed gear change device may be combined between them.

Finally, it is not impossible for the control tie between hand lever and transmission lever to be a conventional flexible cable. In this case, there is no particular problem involved by the angular shifting of the hand lever in the cable pulling direction; however, when the hand lever is returned to the neutral position and when the hand lever is actuated in the reverse direction, one or more elastic means for returning and pulling the cable are to be provided on the hand lever and on the speed gear change device.

The advantages are clearly apparent from the description, and moreover the following is more particularly pointed out:

The simplification of the device with respect to the embodiments of the prior art aiming to similar results. This simplification is obtained as well as in the weight as in the bulk, the number of parts constituting the device, the mounting and the operation. The result of all this is an economical production cost, a higher reliability and a better quality of the produced.

The quickness in changing over the gears, obtained by a mere impulse, or a complete amplitude on the hand lever, causing the accurate shifting of the rack by the pawls coacting with the windows of said rack, with the safe interlocking of the gears and the return of the pawls and of the control hand lever in the neutral position.

The good dirt sealing of the device thanks to the enclosure of the mechanisms and of the hand lever of the speed gear change device within casings which are closed by protection housings.

The clear visualization of the gears which are engaged through the registering on the control hand lever at the handlebar and on the stem.

I claim:

1. Control device providing a plurality of pre-established and controlled positions, more particularly for use with a speed gear shifting device for a cycle and the like having a free wheel and associated sprockets, of the type in which a chain-guide assembly (30) supported slidably by a first pin (29) is shifted transversely relative to a casing (9), this device including control means (41 and 69) which are shifted angularly always with the same amplitude in either direction, from a neutral position up to a limit position; at least one control transmission means (15) for the connection of the control means with a link mechanism (18 and 56), the link mechanism being pivoted angularly in either direction and shifting alternately pawls (23, or 57, 60), cooperating with a rack (27) provided with notches (27b-27c) in a number corresponding to the number of the pre-established positions to be provided, spaced corresponding to the spacing between each one of the sprocket of a free wheel, said rack being mounted parallel to the first pin (29) supporting the chain guide to be positioned from which the rack is depending, and the device being characterized in that a second pin (14) is shifted angularly through the transmission means (15) driven by the control means (41 or 69), said second pin being made fast with the link, an extension (18b or 56a) of which receives the thrust of an elastic means (19) tensioned in accordance with the direction of swivelling and which tends to permanently bring back said link to a neutral position of the control means said link cooperating with a system of at least two partly superposed pawls (23 or 57, 60), intended for engagement in succession within the notches (27b-27c) of the rack (27), the extreme notches (27c) partly obturated of said rack being at different levels for the two extreme notches, so that the corresponding pawl will be unable to pull along the rack beyond the pre-established limit position to be occupied by the chain-guide (30).

2. Device as claimed in claim 1, characterized in that the system for driving the rack (27) and the chain-guide (30) includes two superposed pawls (23), the active portion (23a) of which forms a driving unidirectional nose and a ramp of escape and are inversely disposed for each pawl, said pawls being mounted slidably under the thrust of springs (24) to engaged together or separately within one of the notches (27b-27c) of the rack; the pawls and springs, and an intermediate blade (46) between the pawls, being mounted in a pawl-holder (22) guided slidingly parallel to the rack (27) in one or more slideways (25) of the casing (9) of the device, a mask (26) being mounted fixedly within the casing (9) between the rack (27) and the pawls (23), the mask having a stepped aperture (26a) permitting the driving action of either one of the pawls within the notches of the rack; the pawl-holder (22) being provided with a yoke (20a), intended for cooperation with an end (18c) of the link (18) depending from the second pin (14) which is driven by the transmission means (15) and the controls means (14 or 69).

3. Device as claimed in claim 1, characterized in that the system for driving the rack (27) and the chain-guide (30) includes two partly superposed pawls (57, 60), the active portions (57a, 60a) of which form unidirectional driving nose and escape ramp, and are facing one another, one of them beneath the other one, the first pawl (57) being connected hingedly by a third pin (59) with an end of the link (56), while the second pawl (60) is mounted hingedly by fourth pin (63) on a end of a lever (61) which is in turn connected hingedly and elastically to the other end of the link; the first pawl (57) being held in a spaced position which inactive by abutment against a wall (9n) of the casing, and rocked automatically for th engagement of the nose (57a) thereof within one of the notches (27b-27c) of the rack under the action of a first torsion spring (58) which is wound upon the third pin (59) thereof and connected to said first pawl and to an axial finger (56b) of the link, when said link is actuated to move the chain-guide away from the casing; the second pawl (60) is held in a spaced position when inactive by abutment of the rear face thereof against a wall (9p) of the casing, and tipped automatically for the engagement of the nose (60a) thereof within one of the notches (27b-27c) of the rack, under the action of a second torsion spring (62) which is wound upon the fourth pin (63) thereof, and connected to said second pawl and to a pivot pin (64) of the lever (61), when the link is actuated to move the chain-guide toward the casing; the first pawl (57) being in the latter action rocked rearwardly on a ramp formed by a wall (9n) of the casing.

4. Device as claimed in claim 1, characterized in that the elastic means for returning the link (18 or 56) to the neutral position is a torsion spring (19) wound around the second pin (14) depending from the link and of the transmission means (15), the torsion spring having end limbs which extend on either side of a tongue (18b or 56a) of the link (18 or 56), and are tensionally abutted on either side of an inner projection (9g) of the casing, the tongue (18b or 56a) pulling along one of the limbs of the spring when the link is shifted angularly, while the other limb is retained by the projection (9g) for the automatic return of the link to the neutral position.

5. Device as claimed in claim 1, characterized in that the rack (27) provided with a first limb (27a) having the notches and a second limb (27d) normal to the first limb and having an aperture (27e) with flattened portions for the angular indexation on a corresponding bearing face (28a) formed on a bushing (28) having slots intended for sliding on the first pin (29) of the casing (9), the chain-guide (30) is mounted for free rotation on a spacer (30e) supporting an upper roller (30d) and two cheeks (30a-30b) on a funnel nut (31) screwed on the bushing and locking the second limb (27d) of the rack against a shoulder of said bushing, a spring (32) acting torsionally is mounted around the bushing with an end limb (32a) engaged within one of the slots (28d) of the bushing, the other end limb (32b) acting against a fulcrum (33) of the chain-guide to carry it along angularly in a chain tensioning direction.

6. Device as claimed in claim 1, characterized in that the casing (9) containing the rack, the link and the pawls, is covered by a protection housing (10) fitted in a substantially sealed manner on the casing, the assembly of the casing and of the housing being effected, on the side of the first pin (29) for mounting the chain-guide (30), by means of a first screw (12), and on the side of the second pin (14) supporting the link and the transmission means, by means of a second screw (8) screwed within a threaded boss (9a) of the casing after having been passed through the housing and a support (1) for the connection of the housing-casing assembly with a pin (4) of a rear hub (5) of a cycle.

7. Device as claimed in claim 6, characterized in that the support (1) is transversely adjustable relative to the casing-housing assembly for the previous alignment of the chain-guide (3) the smaller sprocket of a free wheel, the adjustment being effected after unlocking of the support (1) by the first screw (8) and actuation upon a third screw (11) mounted for free rotation without axial shifting on a lower part (1c) of the support passing in front of the casing (9) for being screwed into a threaded hole (9c) of the casing, the transverse sliding of the support (1) relative to the housing-casing assembly being permitted on account of said support (1) being provided with an oblong aperture (1d) for the passage of the first screw (8), said support being guided in its movement by at least one lower groove (1e) cooperating with a slideway (10b) provided on the housing (10).

8. Device as claimed in claim 6, characterized in that the support (1) is supporting for free articulation by a lug (3) for fastening to a pin (4) of a rear hub (5) of a cycle, the lug is provided with a lower outstepped portion (3b) being adapted for abutting against an adjustable stop (7) formed on the support, in order to limit forwardly the tensional rocking of the device.

9. Device as claimed in claim 3, characterized in that the first limb (27a) of the rack has a lower ledge abutted on a roller (55) mounted for free rotation within a recess of the casing, in order to facilitate the shifting of the rack.

10. Device as claimed in claim 2 characterized in that the mask (26) is held fixedly within the casing between the pawls (23) and the rack (27), the mask is provided with folded ends which laterally abut against walls (9h-9i) of the casing, and vertically by a housing (10) which is provided at this level with a face of abutment, the lower edge of the mask (26) being cut away for passage of a bearing roller (55) for the rack.

11. Device as claimed in claim 5, characterized in that the first limb (27a) is provided with an upper ledge having a projection (27f) for abutment against a safety stop (10d) of a housing (10) when the rack is at the end of travel in the direction in which the chain-guide (30) is at the farthest from the casing (9).

12. Device as claimed in claim 3, characterized in that each position of the rack (27) obtained by the action of the pawls (57 or 60) is provided by a rocker (68) mounted for free rotation in a chamber (10s) of a housing (10), the rocker having an enlarged end (68a) abutting against an axial finger (56b) of the link (56) when the latter is in the neutral position, under the action of an elastic organ (67) in abutment within the chamber (10e), the rocker having another contoured end (68b) being then engaged within an indentation (27g) provided on an upper ledge of a first limb (27a) of the rack, the indentations correspond in a number to the number of positions to be obtained.

13. Device as claimed in claim 1, wherein the control means includes a hand lever (41) mounted in an oscillating manner on a pivot-pin (39) supported by a sector (38) indexed on a holder (37), the hand lever being movable angularly always with the same amplitude in either direction, from a neutral position up to a limit position, a torsion spring (43) returning the hand lever automatically to the neutral position, reference marks of the positions obtained of the chain-guide being provided on a barrel (49) driven for rotation only during the shifting of the hand lever from the neutral position up to one of the limit positions, at least one pawl (45) cooperating with teeth (49c) of the barrel, said device being characterized in that the control means is secured to handlbar of the bicycle at a point of easy access for a hand of a user, the hand lever (41) is slanted upwardly because the holder (37) is provided with a slanted upper face, a control tie (52) operationally couples the hand lever to the control transmission means, the barrel (49), the pawl (45) and of a mask (47) thereof for the escape of active portions (45b) of the pawl being entirely housed within the hand lever and insulated from the outside by a protection housing (50) clipped on a raised portion (38c) of the sector (38) and assembled by means of an axial screw (51) threadably engaged within the pivot-pin (39), reference marks being allowed to appear by said housing through a window (50d).

14. Device as claimed in claim 1, wherein the control means includes a hand lever (69) mounted in an oscillating manner on a pivot-pin (74) supported by a sector (73) having a raised portion (73b) which is indexed on a holder (71) said hand lever being movable angularly always with the same amplitude in either direction, from a neutral position up to a limit position, against a torsion spring (75) which returns the hand lever automatically to the neutral position, reference marks of the positions obtained of the chain-guide being provided on a barrel (76) driven for rotation only during the shifting of the hand lever from the neutral position up to one of the limit positions, by at least one pawl device (77) cooperating with teeth (76c) of the drum, said device being characterized in that the control means is secured to a handle bar (70) of a cycle, the hand lever (69) having a central wall (69a) which is journaled on the pivot-pin (74) and supports the pawl (77) which is sector-shaped and mounted hingedly in the center thereof on a depending pivot (69h) of said wall, the pawl having ends forming hooks (77a) intended for alternate engagement between teeth (76c) of the barrel (76) when the hand lever is actuated in either direction a claw spring (78) having a medial portion which is wound round the pawl, an end portion (78a-78b) which are crossed and abutted tensionally against a depending finger (73a) of the sector (73) extending through a sector-shaped aperture (69c) of the wall (69a) of the hand lever for permitting the limited shifting of said hand lever, a control tie (52) operationally couples the hand lever to the control transmission.

15. Device as claimed in claim 14, characterized in that the barrel (76), the pawl (77) and the torsion and claw springs (75 and 78) are enclosed within the body of the hand lever which is covered by fitting thereon of a protection housing (79) allowing the reference marks of the barrel or drum to appear through a window (79a).

16. Device as claimed in either claim 13 or 14, characterized in that the control tie (52) has a cotterpin (53) at one end which is housed for free rotation within a yoke (41f or 69e) provided laterally on the hand lever (41 or 69), the control tie (52) extending then over the raised portion (38c or 73b) of the sector (38 or 73) which has a guiding means (38d or 81).

17. Device as claimed in claim 16, characterized in that the control tie connecting the hand control means (41 or 69) to the transmission means (15) is a metal rod of the half-rigid "piano wire" type (52), covered by a noncompressible and non-extensible sheath retained at the level of the raised portion (38c or 73b) of the sector (38 or 73) and on a sheath-abutment (9m) of the casing (9).

* * * * *